Aug. 2, 1966 J. E. KACHNIK 3,263,865
VEHICLE FOR TRANSPORTING FLUIDS
Filed March 18, 1964 2 Sheets-Sheet 1

INVENTOR.
JOSEPH E. KACHNIK
BY Albert L. Peffers
ATTORNEY

Aug. 2, 1966 J. E. KACHNIK 3,263,865
VEHICLE FOR TRANSPORTING FLUIDS
Filed March 18, 1964 2 Sheets-Sheet 2

INVENTOR.
JOSEPH E. KACHNIK
BY Albert L. Jeffers
ATTORNEY

United States Patent Office 3,263,865
Patented August 2, 1966

3,263,865
VEHICLE FOR TRANSPORTING FLUIDS
Joseph E. Kachnik, Fort Wayne, Ind., assignor to Hendrickson Tandem Corp., Butler, Ind., a corporation of Indiana
Filed Mar. 18, 1964, Ser. No. 352,827
1 Claim. (Cl. 222—159)

This invention relates to a vehicle for transporting fluids, and more particularly, to a vehicle for containing and transporting fluids usable in fire-fighting applications as well as other applications.

There has existed for a considerable time, a need for a readily transportable tank or the like adapted for receiving fluids which are usable for different purposes. For example, the fluid may be used in fire-fighting applications or for various other uses, including agriculture uses and industrial uses; one of the main requirements being, a durable container which has sufficient strength to receive a quantity of the fluid and which will not develop any significant leakages.

Accordingly, one of the objects of the present invention is to produce a readily transportable tank having a new and improved mounting on the chassis of a transport vehicle through which the tank is mounted and is securely and reliably retained.

Another object of the present invention is to produce a new and improved tank for transporting fluids which is resistant to corrosion and includes a plurality of internal baffles to prevent fluid surge or other shifting of the weight of the fluid during transport of the tank and is further inclusive of a transparent portion which permits viewing the internal contents of the tank.

A still further object of the present invention is to provide an improved means for dispensing the fluid within the tank by means of positive displacement pumping of the fluid and which is effective to force the fluid through an outlet orifice and thence through an outlet line controlled by a valve, readily available to the operator for turning the outflow of fluid off and on as desired.

It is an important feature of the present invention that the fluid within the container can be readily carried from one point to the next and the relatively exposed surfaces of the tank are protected by upright corner pieces serving as bumpers which preclude damage to the tank by providing a protective outer covering at the corners of the tank where damage is most prone to occur.

Other objects and features of the present invention will become apparent from a consideration of the following description which proceeds with reference to the accompanying drawings, wherein.

Figure 1:
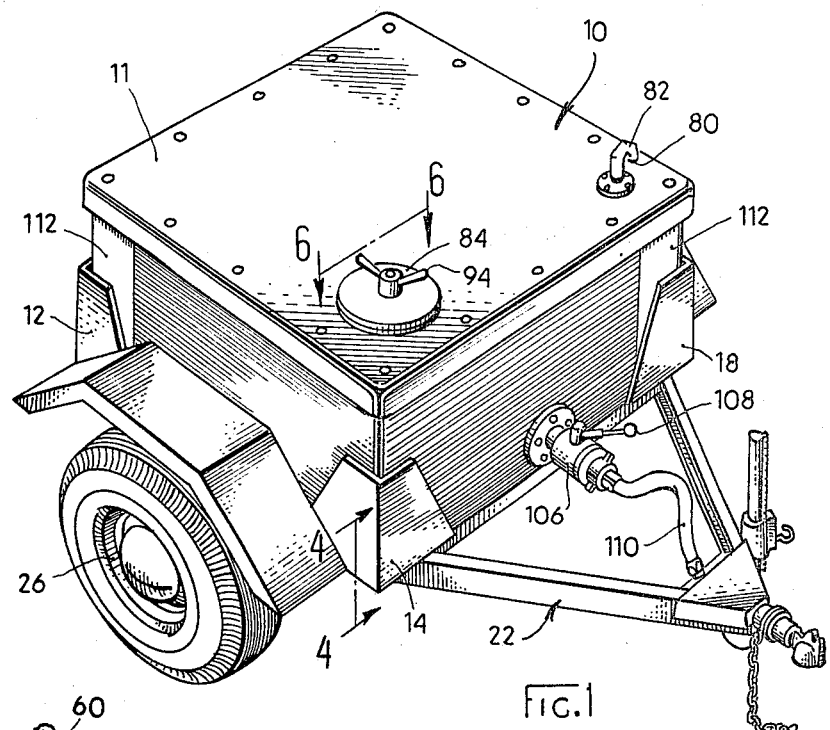
FIGURE 1 is an isometric view of the chassis and tank mounted thereon.
Figure 2:
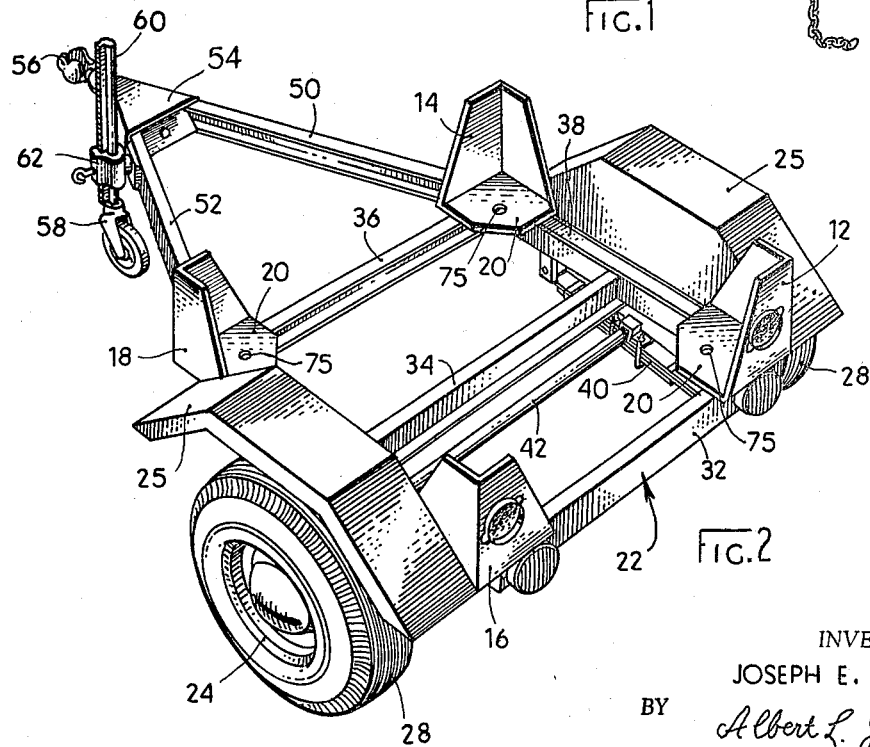
FIGURE 2 is an isometric view of the chassis with the tank removed; and turned 180° from the position shown in FIGURE 1.

Referring now to the drawings, and particularly to FIGURE 1, a fiber reenforced resin tank designated generally by reference numeral 10 and protected at its four corners by vertical upright bumper pieces 12, 14, 16 and 18 which cradle the corners of the tank 10 to protect the tank corners. The upright corner pieces are fastened through their respective bases 20 to a chassis 22 mounted on wheels 24, 26 having tires 28. The chassis 22 (FIGURE 2) comprises a frame having cross pieces 32, 34 and 36 which are connected at their ends by side pieces 38 (one of which is not shown), the entire structure being mounted on leaf springs 40 on an axle 42 which has journaled at its ends the two wheels 24 and 26. A pair of suitable fenders 25 are mounted on the frame.

The apparatus is towed by means of two converging beams 50, 52 which are connected at their ends by a plate 54 and includes a suitable tow connection 56 which secures to the tow vehicle. The towed end of the apparatus is supported by a caster wheel 58 which is mounted at the end of an upright standard 60 vertically adjustable within clamp 62.

The tank 10, in case of the vehicle being used as a fire-fighting vehicle, is charged with fire-fighting chemicals or other liquid such as water. Internally of the tank are upright baffles 64 and 66, which divides the internal portion of the tank into a number of compartments. The compartments are interconnected at the bottom surfaces by notches 68 or the like which permit free fluid communication between the respective internal compartments. The purpose of the baffles is to compartmentalize the internal tank and thereby to prevent fluid surge, thus the fluid is prevented from shifting during starting, stopping or other inertial load changing of the tank.

Figures 4, 6:
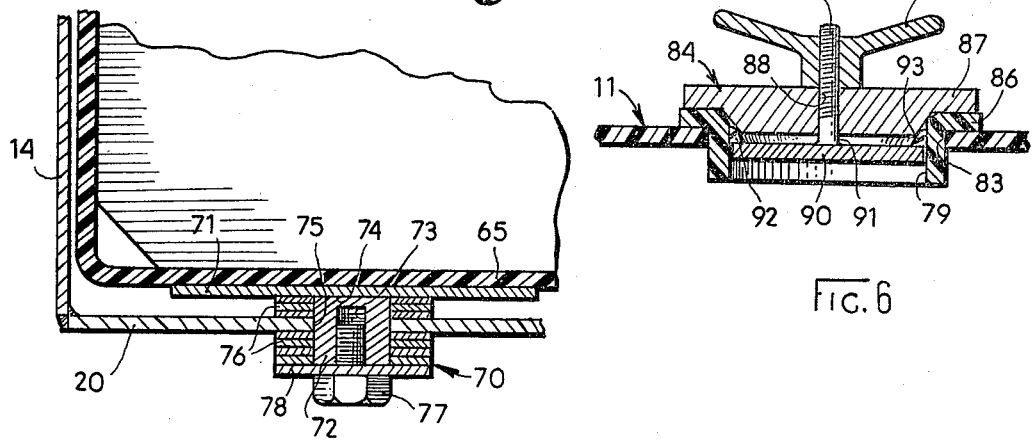
FIGURE 4 is a section view taken on line 4—4 of FIGURE 1.
FIGURE 6 is a section view taken on line 6—6 of FIGURE 1.

The tank 10 is removably mounted on the trailer by the mounting means 70 (FIGURE 4). The mounting means includes a steel plate 71 which is molded or affixed to the fiberglass tank 10. A steel stud 72 having a tapped hole 73 is welded to the steel plate 71 and 74. The bottom plates 20 are provided with openings 75 to receive the steel studs 72. A number of shims 76 are mounted on the stud 72 above and below the bottom plate 20 as required to adjust the distance between the tank 10 and the bottom plate 20. A cap screw 77 having a washer 78 is adapted to be screwed into the tapped hole 73. The tank 10 can be leveled, with respect to the trailer, through varying the number of shims 76. It should be noted that the bumpers 12, 14, 16 and 18 are spaced from the tank 10 as illustrated in FIGURE 4. Each corner of the tank 10 is secured to the bottom plate 20 by similar mounting means 70.

Referring now to FIGURE 6, the filler mechanism 84 will be described. The relatively large opening 83 is provided in the cover 11 of the tank 10. A plastic ring 86 is disposed in the opening 83 and is affixed or molded to the cover 11, forming an inlet opening 79. The cover member 87 is provided with an opening 88 to receive a steel stud 89. The expander plate 90 is disposed within the opening 79 of the plastic ring 86 and is connected to the stud 89 by a weld 91. An elasticized plastic ring 92 is disposed between the expansion member 90 and the cover 87 and is provided with a tapered portion 93. The handle 94 is threadedly mounted on the stud 89. It is readily apparent that by adjusting the handle 94 on the stud 89, the expansion member 90 will expand the ring 92 to provide a tight seal within the ring 86. To remove the cover 84 the handle 94 is rotated to move the expander plate 90 away from the plastic ring 92 so that the plastic ring will contract permitting the cover to be quickly removed. Thus it is seen that a filler mechanism is provided which will form a good seal and still be capable of being quickly removed to permit filling the tank 10 by large diameter hose or by a bucket brigade.

The fluid within the tank is drawn from the interior of the tank by a positive displacement pump or the like from some suitable source, preferably from the tow vehicle (not shown). Above the tank is an opening 80 of a breather for air inlet line 82 which is gooseʼ-necked above the cover 11 of the tank. The purpose of the vent line 82 is to permit an inflow of air to compensate for the fluid as it is drawn from the tank 10.

Figure 3:
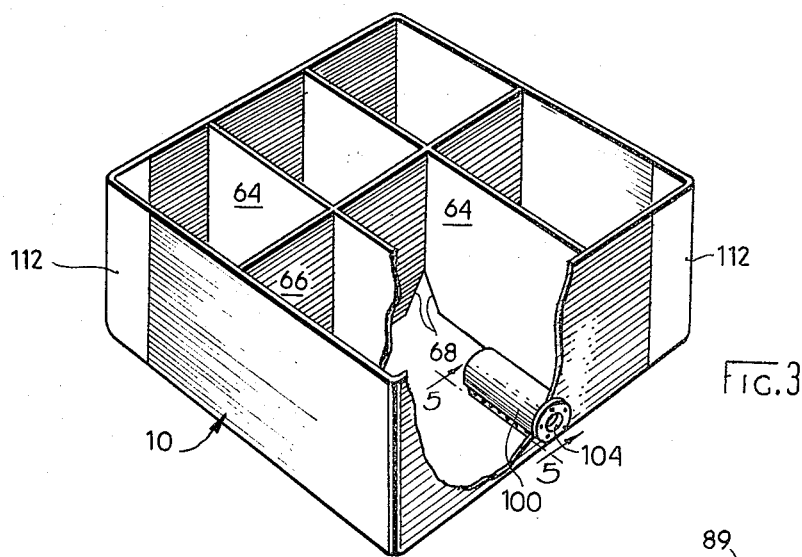
FIGURE 3 is an isometric view of the tank with the cover removed and a portion of the wall of the tank broken away to illustrate the interior of the tank.
Figure 5:
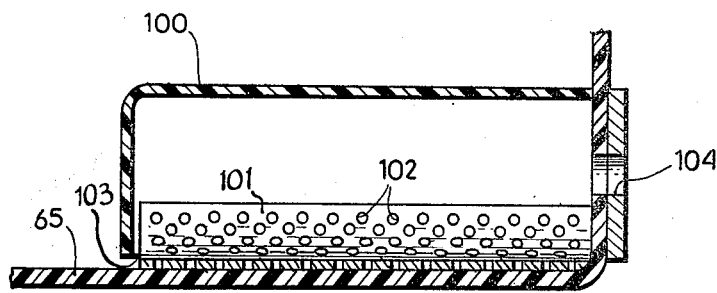
FIGURE 5 is an enlarged detail section view taken on line 5—5 of FIGURE 3.

The pump for the fluid in the tank is effective to draw the fluid into the cylindrical outlet 100 (FIGURES 3 and 5). A screen 101 having orifices 102 which open downwardly toward the base or bottom 65 of the tank is mounted in an opening 103 disposed in the lower portion of the outlet member 100, the fluid being forced radially inwardly into the cylinder 100 and then through outlet opening 104 coupled to a valve housing 106 having an internal valve (not shown) controlled by a handle 108 which is effective for turning the valve off and on, and controlling the outflow of fluid. The fluid is next drawn through a hose 110 and into a pump (not shown) where it is dispensed. The fluid in tank 10, is, in other words, reservoir tank fluid. In the case of fire-fighting operation, the fluid is ultimately directed over the inflamed area or wherever else the fluid is intended to be discharged.

In operation, the tank 10 is first filled with fluid, this being accomplished through the opening 79 formed by the ring 86 (FIGURE 6). At this time, the valve 106 is turned off by the handle 108. The loading continues until the fluid reaches the desired level within the tank.

During loading operation, the tank is vented through line 82 having an opening 80. The tank and its liquid contents are then transported on the chassis through the tow connection 56 which is secured to a suitable tow vehicle. During transport, liquid is prevented from splashing or surging from either side-to-side or front-to-back by means of the baffles 64 and 66 which segregate the fluid into compartments and prevents the fluid from splashing excessively. All of the fluid can, however, be drained from all of the compartments because the compartments are each interconnected by means of notches 68 which permits all of the fluid to discharge from the respective compartments.

At the time of use, the fluid is drawn out of the sealed tank 10, the cover 11 being clamped downwardly over the walls of the tank and the opening 79 (FIGURE 6) being covered by the cover 84. The fluid is continuously withdrawn through line 110 and at the time it is decided to terminate the flow, the valve handle 108 is operated to close the valve 106. The fluid is drawn out first through the orifices 102 into the cylindrical member 100 and then through opening 104 to the valve casing 106 to the flexible line 110. The use of a number of small orifices 102 is advantageous because it reduces the occurrence of foam internally of the tank and also prevents any foreign material from entering the flexible hose 110. It has been found that the cylinder 100 also functions to help prevent cavitation of the pump.

At the end of operation, the handle 108 is moved to off position and the outlet flow is terminated.

During transport, the corners of the tank 10 which are most prone to be damaged are suitably protected by means of the spaced bumpers 12, 14, 16 and 18.

The vehicle is highly maneuverable and can readily be transported to the site of use by trailing behind a tow vehicle. The versatility of the apparatus makes it adapted not only for industrial, but agricultural applications as well, and can transport a variety of different liquids to the point where they are dispensed.

The interior of the tank is visible through portions 112 which are of translucent composition to permit the user to directly gage or view the fluid content of the tank which serves as a reservoir.

Although the present invention has been illustrated and described in connection with a single example embodiment, it will be understood that this example embodiment is illustrative of the invention and is by no means restrictive thereof. It is reasonably to be expected that those skilled in this art can make numerous revisions and adaptations of the invention to suit individual design requirements, and it is intended that such revisions and adaptations which incorporate the herein disclosed principles will be included within the scope of the following claim.

I claim:

A portable apparatus for transporting liquid comprising, in combination: a chassis having a tow connection and ground supporting wheels providing mobility to the apparatus, a plastic tank mounted on said chassis for transportation thereon, said plastic tank having a translucent corner portion to serve as a visible gage of the fluid control of the tank, bumper means spaced from each corner of said tank to protect the tank against damage, outlet means including a cylindrical member having small orifices disposed in the lower portion of the tank for receiving an outflow of liquid therein, a hand-operated valve cooperating with the outlet means for controlling the flow of liquid from said tank, means for venting atmosphere into said tank above the fluid level, inlet means including an expandable ring adapted to provide a seal for charging replacement fluid into said tank, baffle means disposed within said tank to prevent liquid surging, and adjustment means for mounting and leveling said tank on the chassis.

References Cited by the Examiner

UNITED STATES PATENTS

| | | | |
|---|---|---|---|
| 831,399 | 9/1906 | Wolf | 248—149 X |
| 1,242,930 | 10/1917 | Fields | 222—176 |
| 1,894,732 | 1/1933 | Cheney | 222—478 X |
| 2,092,925 | 9/1937 | Lithgow | 222—478 X |
| 2,160,477 | 5/1939 | Kramer. | |
| 2,493,164 | 1/1950 | Rose | 222—159 X |
| 2,515,568 | 7/1950 | Pharo | 222—189 |
| 2,538,531 | 1/1951 | Likens | 296—35.1 |
| 2,603,497 | 7/1952 | Bramann et al. | 280—5 |
| 3,163,435 | 12/1964 | Krueger. | |

M. HENSON WOOD, JR., *Primary Examiner.*

LOUIS J. DEMBO, *Examiner.*

A. KNOWLES, *Assistant Examiner.*